(12) United States Patent
Watanabe (10) Patent No.: US 11,511,568 B2
(45) Date of Patent: Nov. 29, 2022

(54) TIRE

(71) Applicant: BRIDGESTONE CORPORATION, Tokyo (JP)

(72) Inventor: Toshiyuki Watanabe, Higashiyamato (JP)

(73) Assignee: BRIDGESTONE CORPORATION, Tokyo (JP)

( * ) Notice: Subject to any disclaimer, the term of this patent is extended or adjusted under 35 U.S.C. 154(b) by 530 days.

(21) Appl. No.: 16/486,157

(22) PCT Filed: Mar. 1, 2018

(86) PCT No.: PCT/JP2018/007894
§ 371 (c)(1),
(2) Date: Aug. 15, 2019

(87) PCT Pub. No.: WO2018/159782
PCT Pub. Date: Sep. 7, 2018

(65) Prior Publication Data
US 2019/0375247 A1    Dec. 12, 2019

(30) Foreign Application Priority Data

Mar. 2, 2017  (JP) .............................. JP2017-039585

(51) Int. Cl.
*B60C 11/13*    (2006.01)
*B60C 11/03*    (2006.01)

(52) U.S. Cl.
CPC .......... *B60C 11/13* (2013.01); *B60C 11/0306* (2013.01); *B60C 2011/0353* (2013.01);
(Continued)

(58) Field of Classification Search
CPC ..... B60C 11/1369; B60C 11/01; B60C 11/03; B60C 11/0306; B60C 11/13;
(Continued)

(56) References Cited

U.S. PATENT DOCUMENTS 6,220,321 B1    4/2001  Yoshioka et al.
2009/0294003 A1  12/2009  Horiuchi
(Continued)

FOREIGN PATENT DOCUMENTS

DE    102010016978 A1   11/2011
EP       2130692 A1   12/2009
(Continued)

OTHER PUBLICATIONS

Machine translation of JP07-309105 (no date).*
(Continued)

*Primary Examiner* — Katelyn W Smith
*Assistant Examiner* — Philip N Schwartz
(74) *Attorney, Agent, or Firm* — Kenja IP Law PC (57) ABSTRACT

The tire has, in a tread surface, at least one circumferential groove continuously extending in a tire circumferential direction, and a shoulder land portion partitioned with the circumferential groove and a tread ground contact edge, the shoulder land portion has a first width direction groove that extends in a tire width direction and via which the circumferential groove communicates with the tread ground contact edge, the first width direction groove has, in the first width direction groove, a second width direction groove that communicates with the first width direction groove, and respective groove widths of the circumferential groove, the first width direction groove and the second width direction groove satisfy a relational expression of "the groove width of the circumferential groove>the groove width of the first width direction groove>the groove width of the second width direction groove".

3 Claims, 4 Drawing Sheets (52) U.S. Cl.
CPC ............... *B60C 2011/0365* (2013.01); *B60C 2011/0367* (2013.01); *B60C 2011/0369* (2013.01); *B60C 2011/0381* (2013.01)

(58) Field of Classification Search
CPC ..... B60C 2011/1338; B60C 2011/1361; B60C 2011/0353; B60C 2011/0365; B60C 2011/0367; B60C 2011/0369; B60C 2011/0381
See application file for complete search history.

(56) References Cited

U.S. PATENT DOCUMENTS

| | | | |
|---|---|---|---|
| 2012/0006457 A1* | 1/2012 | Miyazaki | B60C 11/0306 152/209.21 |
| 2014/0326382 A1 | 11/2014 | Iwata | |
| 2015/0375570 A1 | 12/2015 | Akashi | |

FOREIGN PATENT DOCUMENTS

| | | | | |
|---|---|---|---|---|
| EP | 2653320 | A2 | 10/2013 | |
| JP | 60116510 | A * | 6/1985 | ......... B60C 11/0316 |
| JP | S60116510 | A | 6/1985 | |
| JP | 06024212 | A * | 2/1994 | ..... B60C 2011/1213 |
| JP | H07172114 | A | 7/1995 | |
| JP | 07309105 | A * | 11/1995 | ......... B60C 11/0309 |
| JP | H0853004 | A | 2/1996 | |
| JP | H11198610 | A | 7/1999 | |
| JP | 2007001484 | A | 1/2007 | |
| JP | 2010013091 | A | 1/2010 | |
| JP | 2011051529 | A | 3/2011 | |
| JP | 2011168221 | A | 9/2011 | |
| JP | 2012016991 | A | 1/2012 | |
| JP | 2013129427 | A | 7/2013 | |
| JP | 2013139168 | A | 7/2013 | |
| JP | 2014166827 | A | 9/2014 | |

OTHER PUBLICATIONS

Machine translation of JP06-024212 (no date).*
Machine translation of JP60-116510 (no date).*
Jun. 30, 2021, search result of Office Action issued by the China National Intellectual Property Administration in the corresponding Chinese Patent Application No. 201880015208.7.
Dec. 4, 2019, search result of the Extended European Search Report issued by the European Patent Office in the corresponding European Patent Application No. 18761141.3.
May 22, 2018, International Search Report issued in the International Patent Application No. PCT/JP2018/007894.
Sep. 3, 2019, International Preliminary Report on Patentability issued in the International Patent Application No. PCT/JP2018/007894.
Nov. 30, 2020, search result of Office Action issued by the China National Intellectual Property Administration in the corresponding Chinese Patent Application No. 201880015208.7.

* cited by examiner

TIRE

TECHNICAL FIELD

The present disclosure relates to a tire.

BACKGROUND

In recent years, there has been sought for quietness of a vehicle, and reduction of noise has been demanded. Noise generated by tire load rolling noticeably contributes to noise generated from a running car. Above all, tire noise of a high frequency especially around 1000 Hz is a main cause for vehicle exterior noise. Also from a viewpoint of environmental problems, a measure to reduce the noise is demanded.

This tire noise around 1000 Hz is mainly caused by air column resonance sound. The air column resonance sound is noise generated by resonance of air in a tube surrounded with a circumferential groove continuously extending in a circumferential direction of a tread surface and a road surface, and the noise is often observed in a range from about 800 to 1200 Hz in a general passenger vehicle. Such air column resonance sound has a high peak level and a broad frequency band, and accordingly occupies a large part of the noise generated from the tire.

Furthermore, human hearing is particularly sensitive to the frequency band around 1000 Hz. Therefore, also for the purpose of improving quietness to be felt during the running, it is effective to reduce the air column resonance sound.

Here, examples of the tire in which the reduction of the air column resonance sound is expected include a tire in which a side branch type resonator having a vertical groove and a lateral groove is provided in a rib-shaped land portion partitioned by a plurality of circumferential grooves (Patent Literature 1), and a tire in which Helmholtz-type resonator is provided in a land portion similar to the above land portion, the resonator having an air chamber separated from a circumferential groove and opened in the surface of the land portion, and one or more narrowed necks via which the air chamber communicates with the circumferential groove (Patent Literature 2).

CITATION LIST

Patent Literature

PTL 1: Japanese Patent Laid-Open No. 2011-051529
PTL 2: Japanese Patent Laid-Open No. 2014-166827

SUMMARY

Technical Problem

In the above described side branch type resonator and Helmholtz-type resonator, a large or complicated-shaped groove or recess needs to be provided in a land portion of a tread. Consequently, a degree of freedom in design of the tread is limited, and a rigidity distribution of the land portion becomes non-uniform, which might cause uneven wear.

To solve the problem, an object of the disclosure is to provide a tire that is capable of maintaining a degree of freedom in design of a tread and inhibiting uneven wear in the tread while reducing air column resonance sound.

Solution to Problem

A tire of the disclosure is a tire having, in a tread surface, at least one circumferential groove continuously extending in a tire circumferential direction, and a shoulder land portion partitioned with the circumferential groove and a tread ground contact edge, wherein the shoulder land portion has a first width direction groove that extends in a tire width direction and via which the circumferential groove communicates with the tread ground contact edge, the first width direction groove has, in the first width direction groove, a second width direction groove that communicates with the first width direction groove, and respective groove widths of the circumferential groove, the first width direction groove and the second width direction groove satisfy a relational expression of "the groove width of the circumferential groove>the groove width of the first width direction groove>the groove width of the second width direction groove". According to the tire of the disclosure having such a configuration, it is possible to maintain a degree of freedom in design of the tread and to inhibit uneven wear in the tread while reducing air column resonance sound.

Here, "the tread surface" described herein means an outer peripheral surface over an entire circumference of the tire which comes in contact with a road surface when the tire which is assembled to a rim and to which a predetermined internal pressure is applied is rolled in a state where a maximum load is loaded onto the tire, and "the tread ground contact edge" means the tire width direction edge of the tread surface.

Furthermore, "a reference state" herein indicates a state where the tire is assembled to the rim, the predetermined internal pressure is applied and any load is not loaded, and "during the ground contact of the tire" indicates a time when the tire stands still on a flat road surface in the state where the tire is assembled to the rim, the predetermined internal pressure is applied and the maximum load is loaded.

The above "rim" indicates a standard rim in an applicable size (a measuring rim in Standards Manual of ETRTO, or a design rim in Year Book of TRA) which is described or to be described in future in an industrial standard valid in a district where tires are produced and used, for example, JATMA Year Book of JATMA (Japan Automobile Tyre Manufacturers Association) in Japan, ETRTO (the European Tyre and Rim Technical Organization) Standards Manual in Europe, TRA (the Tire and Rim Association, Inc.) Year Book in US or the like (i.e., the above "rim" also includes a size that can be included in the above industrial standard in future in addition to the current sizes. Examples of "the size to be described in future" include sizes described as "future developments" in ETRTO Standards Manual 2013). However, when the size is not described in the above industrial standard, the above rim refers to a rim with a width corresponding to a bead width of the tire.

Additionally, "the predetermined internal pressure" refers to an air pressure (a maximum air pressure) corresponding to a maximum load capacity of a single wheel in an applicable size ply rating as described in the above JATMA Year Book or the like. When the size is not described in the above industrial standard, "the predetermined internal pressure" refers to the air pressure (the maximum air pressure) corresponding to the maximum load capacity prescribed for each tire-installed vehicle. Furthermore, "the maximum load" refers to a load corresponding to the above maximum load capacity.

Note that air mentioned herein can be also replaced with, for example, an inert gas such as a nitrogen gas.

Furthermore, "the groove width of the circumferential groove" herein refers to a length in an orientation orthogonal to an extending direction of the circumferential groove, which is measured in the reference state. Similarly, each of "the groove width of the first width direction groove" and "the groove width of the second width direction groove" refers to a length in an orientation orthogonal to an extending direction of the first width direction groove having the second width direction groove, which is measured in the reference state.

Note that also in each of the above grooves, when the groove width changes along a depth direction of the groove, it is considered that a maximum width is the groove width (denoted with W1, W2 or W3 in the following embodiment) unless a condition such as a measurement position in the depth direction is specified otherwise.

Hereinafter, it is considered that a dimension of each element such as the groove is measured in the reference state (e.g., a dimension of each element in the tread surface is measured on a developed view of the tread surface in the reference state), unless otherwise noted.

Advantageous Effect

According to the disclosure, there can be provided a tire that is capable of maintaining a degree of freedom in design of a tread and inhibiting uneven wear in the tread while reducing air column resonance sound.

DETAILED DESCRIPTION

Hereinafter, embodiments of a tire according to the disclosure will be described with reference to the drawings.

Figure 1:
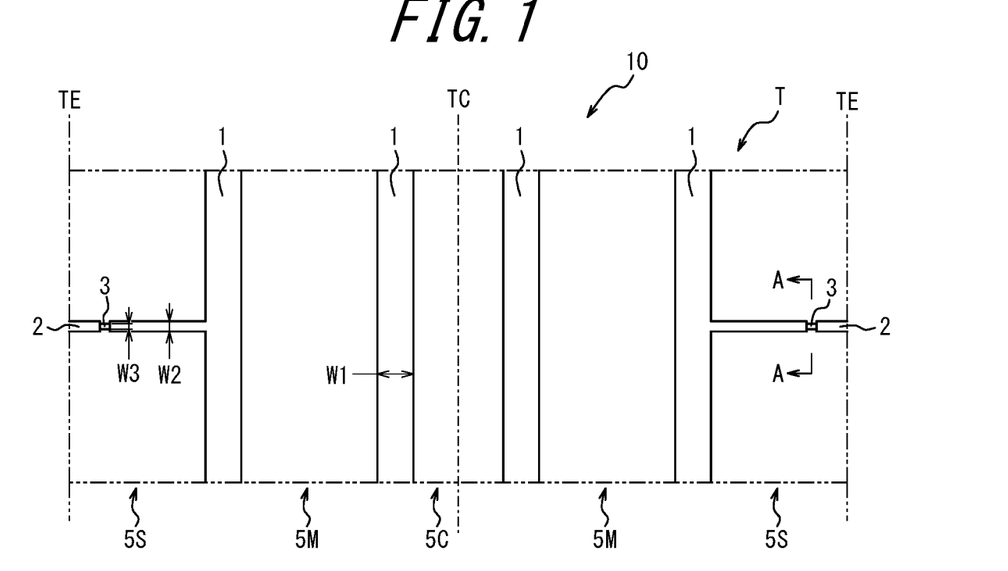
FIG. 1 is a developed view schematically illustrating a tread surface of a tire according to an embodiment of the disclosure.

FIG. 1 is a developed view schematically illustrating a tread surface T of a tire 10 according to an embodiment of the disclosure. The tire 10 has, in the tread surface T, at least one circumferential groove 1 (four grooves in an illustrated example) continuously extending in a tire circumferential direction (extending along the tire circumferential direction, i.e., continuously extending in the tire circumferential direction at an angle of 0° to the tire circumferential direction in the illustrated example). By the four circumferential grooves 1 and both tread ground contact edges TE, there are partitioned and formed a center land portion 5C including a tire equatorial plane TC, two intermediate land portions 5M adjacent to both outer sides of the center land portion 5C in a tire width direction via the circumferential groove 1, and two shoulder land portions 5S adjacent to both outer sides of the intermediate land portions in the tire width direction via the circumferential grooves 1. Each circumferential groove 1 in the present embodiment is a linear groove extending along the tire circumferential direction and continuously in the tire circumferential direction. In the tire of the disclosure, however, the circumferential groove 1 can be a zigzag or wavy-shaped groove being inclined to the tire circumferential direction (the tire equatorial plane TC) and continuously extending in the tire circumferential direction. The tire of the disclosure may include at least one circumferential groove 1, and the tire of the present embodiment includes four circumferential grooves. However, the disclosure is not limited to this example, and it is preferable that a plurality of circumferential grooves are present. A number of circumferential grooves may be two, three, five or more.

As described above, the tire 10 of the present embodiment has, in the tread surface T, at least one circumferential groove 1 continuously extending in the tire circumferential direction, and the shoulder land portions 5S partitioned with the circumferential grooves 1 and the tread ground contact edges TE.

Note that the tire of the present embodiment is a pneumatic radial tire for passenger vehicles, but the disclosure is also applicable to another type of tire that is required to reduce air column resonance sound.

Furthermore, each shoulder land portion 5S has a plurality of first width direction grooves 2 (one of them is illustrated in the illustrated example) that extend in the tire width direction, via which the circumferential groove 1 communicates with the tread ground contact edge TE, and that are arranged away from each other in the tire circumferential direction in the present embodiment, and by the first width direction grooves 2, a plurality of block-shaped land portions are formed in the tire circumferential direction.

This first width direction groove 2 has, in the first width direction groove 2, a second width direction groove 3 communicating with the first width direction groove 2. The second width direction groove 3 communicates with the first width direction groove 2 at both edges of the second width direction groove 3 in an extending direction so that the first width direction groove 2 can communicate with the circumferential groove 1 and the tread ground contact edge TE. A groove width W2 of the first width direction groove 2 in the present embodiment is smaller than a groove width W1 of the circumferential groove 1. More specifically, the first width direction groove 2 is a narrow groove with a groove width of, for example, about 2 mm, and the groove width is constant over the whole region in the tire width direction excluding a region where the second width direction groove 3 is disposed. It is preferable that the first width direction groove 2 has a smaller cross-sectional area and/or a smaller groove depth than the circumferential groove 1. In the present embodiment, the first width direction groove 2 extends along the tire width direction (i.e., at an angle of 0° to the tire width direction), but the first width direction groove 2 may be inclined and extend, for example, at an angle of 45° or less to the tire width direction as long as the groove has a component in the tire width direction.

Figure 2:
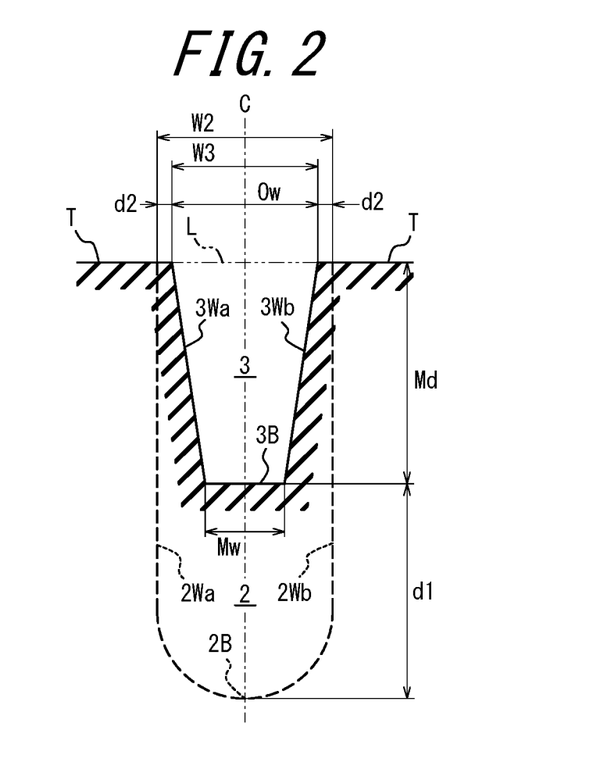
FIG. 2 is a cross-sectional view of a second width direction groove along line A-A of FIG. 1.

The second width direction groove 3 will be described with reference to FIG. 2. FIG. 2 is a cross-sectional view along line A-A illustrated in FIG. 1, and illustrates a cross section of the second width direction groove 3 provided in the first width direction groove 2, the cross section being formed by a plane orthogonal to the extending direction of the first width direction groove 2. Note that for description herein, shapes of groove walls 2Wa and 2Wb and a groove bottom 2B of the first width direction groove 2 are illustrated with broken lines. As illustrated, the second width direction groove 3 has a smaller depth and a narrower groove width W3 than the first width direction groove 2. Groove walls 3Wa and 3Wb of the second width direction groove 3 (both groove walls that partition the second width direction groove 3) are inclined and extend in a direction approaching an opening centerline C of the first width direction groove 2, toward a groove bottom 3B of the second width direction groove 3 in a depth direction. Inner edges of the groove walls in a tire radial direction are connected by the groove bottom 3B of the second width direction groove 3. Therefore, the second width direction groove 3 in the present embodiment has an inverted trapezoidal cross section.

Here, in the tire of the disclosure, the respective groove widths of the circumferential groove 1, the first width direction groove 2 and the second width direction groove 3 need to satisfy a relational expression of "the groove width W1 of the circumferential groove 1>the groove width W2 of the first width direction groove 2>the groove width W3 of the second width direction groove 3".

As described above, during vehicle running, air in a tube surrounded by the circumferential grooves 1 and a road surface resonates to generate resonance sound. In the tire of the disclosure, however, the groove widths W1, W2 and W3 of the circumferential groove 1, the first width direction groove 2 and the second width direction groove 3 satisfy the above relation, and hence, this resonance sound can be reduced via the second width direction grooves 3. More specifically, air (sound waves) flowing into the circumferential grooves 1 to pass through the circumferential grooves 1 during the vehicle running also moves outwardly in the tire width direction via the first width direction grooves 2. However, kinetic energy of the air is converted into thermal energy by a viscosity friction (friction generated by squeezing the air in the second width direction grooves 3) during the passage of the air through the second width direction grooves 3, and this thermal energy is released to outside, or absorbed by the groove walls 3Wa and 3Wb, the groove bottoms 3B and others of the second width direction grooves 3, thereby reducing the resonance sound. Thus, in the tire of the disclosure, the air column resonance sound can be reduced using a damping effect of sound waves by viscosity of air in the second width direction grooves 3, especially inlets and outlets of the grooves. Furthermore, in the tire of the disclosure, differently from a conventional branch type or Helmholtz-type resonator, a large or complicated-shaped groove or recess does not have to be provided in a tread surface, and the narrow second width direction groove 3 may only be provided in each first width direction groove 2. Consequently, it is possible to maintain a degree of freedom in design of the tread. Furthermore, rigidity of the land portion of the tread is hard to become non-uniform, and hence, uneven wear in the tread surface can be inhibited. Specifically, in the tire of the disclosure, the air column resonance sound can be damped in the first width direction groove 2 without providing the specific resonator in the tread surface. Consequently, it is possible to reduce the air column resonance sound without hindering the degree of freedom in design of the tread and while uniformly keeping the rigidity of the land portion of the tread. However, another resonator may be provided.

Furthermore, in the tire according to the disclosure, it is preferable that a ratio (W2/W1) of the groove width W2 of the first width direction groove 2 to the groove width W1 of the circumferential groove 1 is 0.1 or more and 0.5 or less. When the ratio is 0.1 or more, a sufficient amount of air can be sent to the first width direction grooves 2, and the air column resonance sound can be further reduced. Furthermore, when the ratio is 0.5 or less, the air flowing from the circumferential grooves 1 can be sufficiently squeezed in the first width direction grooves 2, and the air can be sent into the second width direction grooves 3 at a comparatively high speed. Consequently, the air column resonance sound can be further reduced, the degree of freedom in design of the tread can be more sufficiently achieved, and the uneven wear in the tread can be further inhibited. Additionally, when the ratio is 0.5 or less, pattern noise can be reduced. For similar reasons, it is further preferable that the above ratio is 0.2 or more and 0.4 or less.

Furthermore, it is preferable that a ratio (W3/W2) of the groove width W3 of the second width direction groove 3 to the groove width W2 of the first width direction groove 2 is 0.1 or more and 0.8 or less. When the ratio is 0.1 or more, a sufficient amount of air can be sent into the second width direction groove 3. Consequently, the air column resonance sound can be further reduced. Additionally, when the ratio is 0.8 or less, the air flowing from the first width direction groove 2 can be sufficiently squeezed in the second width direction groove 3, and the air column resonance sound can be further reduced. For similar reasons, it is further preferable that the above ratio is 0.2 or more and 0.6 or less.

Note that when the groove width of each groove changes along the extending direction of the groove, it is considered that the groove width at the following position is the groove width of the groove. Specifically, when the groove width of the second width direction groove changes along the extending direction of the second width direction groove, it is considered that the groove width of the second width direction groove at a boundary position between the second width direction groove and the first width direction groove that communicates with the second width direction groove is the groove width of the second width direction groove, and when the groove width of the first width direction groove changes along the extending direction of the first width direction groove, it is considered that a maximum groove width of the groove is the groove width of the first width direction groove.

The groove width of the first width direction groove and the groove width of the second width direction groove may continuously and smoothly change at the boundary position between both the grooves. However, from a viewpoint of improving a reduction effect of the air column resonance sound, it is preferable that the groove widths do not continuously or smoothly change at the boundary position between both the grooves. However, from the viewpoint of further improving the reduction effect of the air column resonance sound, it is especially preferable that the groove width of the first width direction groove and the groove width of the second width direction groove change intermittently at the boundary position between both the grooves as in the present embodiment (the groove width of the first width direction groove is different from the groove width of the second width direction groove at the boundary position (in an interface)).

Further in the tire according to the disclosure, it is preferable that a distance d1 between the groove bottom 3B of the second width direction groove 3 and the groove bottom 2B of the first width direction groove 2 is 1.0 mm or more. This is because air flowing in the vicinity of the groove bottom 2B of the first width direction groove 2 is affected by friction with the groove bottom 2B to flow at a low speed, while air flows through a region 1 mm or more away from the groove bottom 2B at a sufficiently high speed. This air layer having a sufficiently high speed passes through the second width direction groove 3, thereby improving the damping effect by the viscosity. The air column resonance sound can be further reduced.

Additionally, it is preferable that a distance d2 between the groove wall 3Wa, 3Wb of the second width direction groove 3 and the groove wall 2Wa, 2Wb of the first width direction groove 2 is 0.25 mm or more. This is because air flowing in the vicinity of the groove wall 2Wa, 2Wb of the first width direction groove 2 is affected by friction with the groove wall 2Wa, 2Wb to flow at a low speed, while air flows through a region 0.25 mm or more away from the groove wall 2Wa, 2Wb at a comparatively high speed. This air having the comparatively high speed passes through the second width direction groove 3, thereby improving the damping effect by the viscosity. The air column resonance sound can be further reduced.

Note that each of "the distance between the groove bottom of the second width direction groove and the groove bottom of the first width direction groove" and "the distance between the groove wall of the second width direction groove and the groove wall of the first width direction groove" refers to the shortest length between both the groove bottoms or between both the groove walls.

Furthermore, it is preferable that at least a part of the surface of the groove wall 3Wa, 3Wb of the second width direction groove 3 is subjected to concavo-convex processing, to set an arithmetic average roughness Ra of the surface to 1.0 μm or more and 5.0 μm or less. This is because, in this case, energy loss in the second width direction groove 3 increases and the air column resonance sound can be further reduced. Note that "the arithmetic average roughness Ra" is "the arithmetic average roughness Ra" prescribed in JIS B 0601 (2001), and a unit length is obtained as 10 mm.

Additionally, it is preferable that a cross-sectional area of the second width direction groove 3 and a cross-sectional area of the first width direction groove 2 satisfy "0.08≤the cross-sectional area of the second width direction groove 3/the cross-sectional area of the first width direction groove 2≤0.80". Specifically, in FIG. 2, it is preferable that the cross-sectional area of the second width direction groove 3 surrounded by a virtual line L smoothly connecting the tread surface T on one side of the first width direction groove 2 in the tire circumferential direction to the tread surface T on the other side in the tire circumferential direction, and the groove walls 3Wa and 3Wb and the groove bottom 3B of the second width direction groove 3 is 0.08 times or more and 0.80 times or less as large as the cross-sectional area of the first width direction groove 2 surrounded by the above virtual line L and the groove walls 2Wa and 2Wb and the groove bottom 2B of the first width direction groove 2.

When the cross-sectional area of the second width direction groove is 0.08 times or more as large as the cross-sectional area of the first width direction groove 2, a sufficient amount of air passes through the second width direction groove 3, and a sufficient damping effect can be obtained in the second width direction groove 3. Consequently, the air column resonance sound can be further reduced. Furthermore, when the cross-sectional area is 0.8 times or less, air can be sufficiently squeezed in the second width direction groove 3, and the damping effect in the second width direction groove 3 can increase. Consequently, the air column resonance sound can be further reduced.

From a viewpoint of further reducing the air column resonance sound, it is preferable that the cross-sectional area of the second width direction groove 3 is 0.5 times or less as large as the cross-sectional area of the first width direction groove 2. This is because when the cross-sectional area is 0.5 times or less, the damping effect in the second width direction groove 3 increases, and the air column resonance sound is further reduced. For similar reasons, it is further preferable that the cross-sectional area of the second width direction groove 3 is 0.4 times or less as large as the cross-sectional area of the first width direction groove 2.

Note that although not illustrated, in the tire of the disclosure, the cross-sectional area of the second width direction groove changes along the extending direction of the second width direction groove. In this case, it is considered that the cross-sectional area of the second width direction groove at a boundary position between the second width direction groove and the first width direction groove that communicates with the second width direction groove is the cross-sectional area of the second width direction groove. When the cross-sectional area of the first width direction groove changes along the extending direction of the first width direction groove, it is considered that a maximum cross-sectional area of the groove is the cross-sectional area of the first width direction groove.

The cross-sectional area of the first width direction groove and the cross-sectional area of the second width direction groove may continuously and smoothly change at the boundary position between both the grooves. However, from a viewpoint of increasing a reduction effect of the air column resonance sound, it is preferable that the cross-sectional areas do not continuously or smoothly change at the boundary position between both the grooves. Furthermore, from a similar viewpoint, it is further preferable that the cross-sectional area of the first width direction groove rapidly decreases to reach the second width direction groove so that the cross-sectional area of the second width direction groove to the cross-sectional area of the first width direction groove, for example, at a position (also including the boundary position) that is 1.0 mm or less away from the boundary position between both the grooves on a side of the first width direction groove in the extending direction of the first width direction groove has the above described predetermined cross-sectional area ratio. However, from the viewpoint of further increasing the reduction effect of the air column resonance sound, it is especially preferable that the cross-sectional area of the first width direction groove and the cross-sectional area of the second width direction groove change intermittently at the boundary position between both the grooves (the cross-sectional area of the first width direction groove is different from the cross-sectional area of the second width direction groove at the boundary position (in the interface)) as in the present embodiment.

Furthermore, it is preferable that an extending length X (see FIG. 7) of the second width direction groove 3 along the extending direction of the first width direction groove 2 is 1.0 mm or more and 3.0 mm or less. When the length is 1.0 mm or more, it is possible to inhibit decrease of rigidity of the shoulder land portion 5S due to the provision of the first width direction groove 2. Additionally, the above described damping effect in the second width direction groove 3 is not especially proportional to the extending length X, and it is sufficient that the length is 3.0 mm or less.

In addition, it is possible to dispose the second width direction groove 3 in the first width direction groove 2 having an arbitrary groove width as long as "the groove width W1 of the circumferential groove 1>the groove width W2 of the first width direction groove 2". In particular, the groove is provided in the first width direction groove 2 having the comparatively small groove width, i.e., the groove width W2 of 1.0 mm or more and 3.0 mm or less, whereby it is possible to further effectively reduce the air column resonance sound while inhibiting the decrease of the rigidity of the shoulder land portion 5S due to the provision of the first width direction groove 2.

Figure 3A:
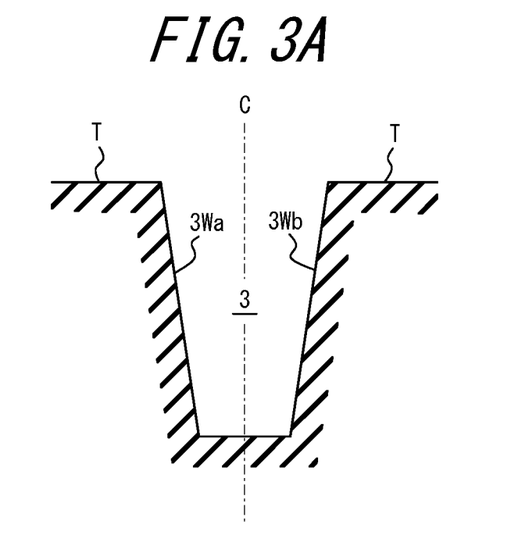
FIG. 3A is a cross-sectional view of the second width direction groove in a reference state of the tire illustrated in FIG. 1.
Figure 3B:
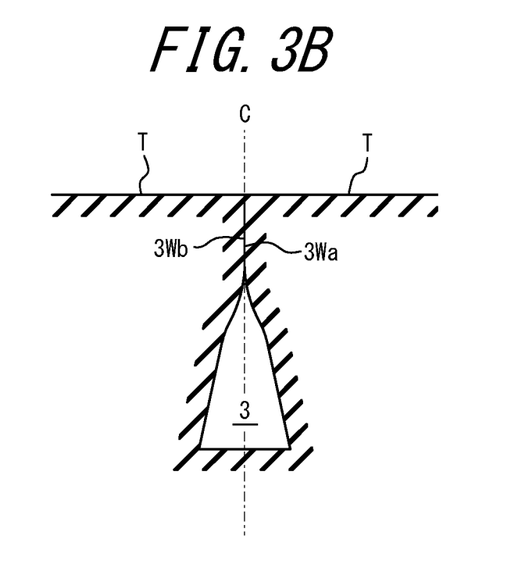
FIG. 3B is a cross-sectional view of the second width direction groove during ground contact of the tire illustrated in FIG. 1.

Furthermore, in the tire of the disclosure, the shape of a cross section of the second width direction groove 3 orthogonal to the first width direction groove 2 is not limited to the inverted trapezoidal shape, and can be an arbitrary shape. However, to obtain technological effects of the disclosure, the second width direction groove 3 needs to have a shape that is hard to at least completely close during the ground contact of the tire. In the present embodiment, as illustrated in FIG. 3A, the second width direction groove 3 has an inverted trapezoidal cross section in a reference state. However, as illustrated in FIG. 3B, due to collapsing of the tread land portion during the ground contact of the tire, the groove walls 3Wa and 3Wb of the second width direction groove 3 come in contact with each other on a side of the tread surface T, and the second width direction groove 3 only partially closes.

Figure 4:
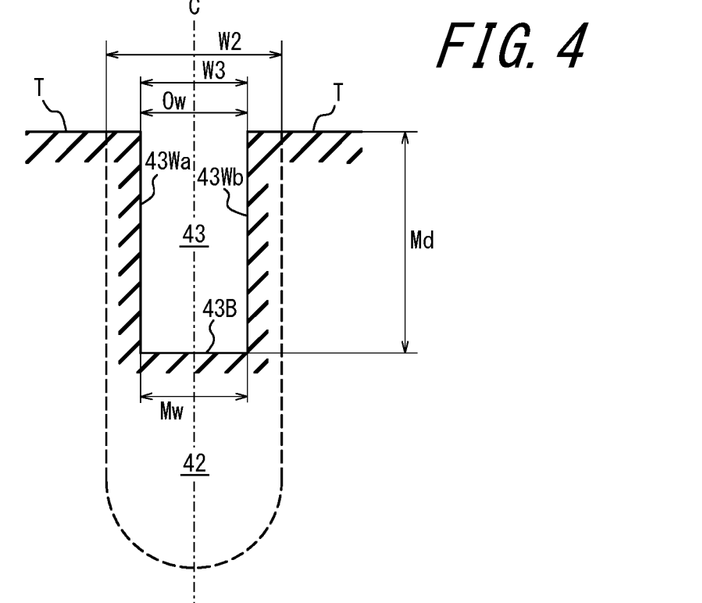
FIG. 4 is a cross-sectional view of a second width direction groove in another embodiment of the disclosure.

FIG. 4 illustrates a second width direction groove 43 in another embodiment of the disclosure as an example of the shape of the second width direction groove that is hard to close even during the ground contact of the tire. The second width direction groove 43 has a rectangular cross section with long sides extending along a groove depth direction. Specifically, groove walls 43Wa and 43Wb of the second width direction groove 43 extend toward a groove bottom along an opening centerline C of a first width direction groove 42, and inner edges of the groove walls 43Wa and 43Wb in a tire radial direction are connected by a groove bottom 43B. Note that in this example, a ratio of a groove width Ow of the second width direction groove 43 at an opening edge to a tread surface T (the groove width orthogonal to an extending direction of the second width direction groove 43, i.e., a length in a tire circumferential direction in the present embodiment. This also applies below.), a groove width Mw in the groove bottom 43B, and a groove depth Md (a length in the tire radial direction) is 1:1:3. More specifically, in the present embodiment, for example, Ow=Mw=1 mm, and Md=3 mm. Note that in the present embodiment, the above groove width Ow and the above groove width Mw are both equal to the groove width W3 defined herein.

Figure 5:
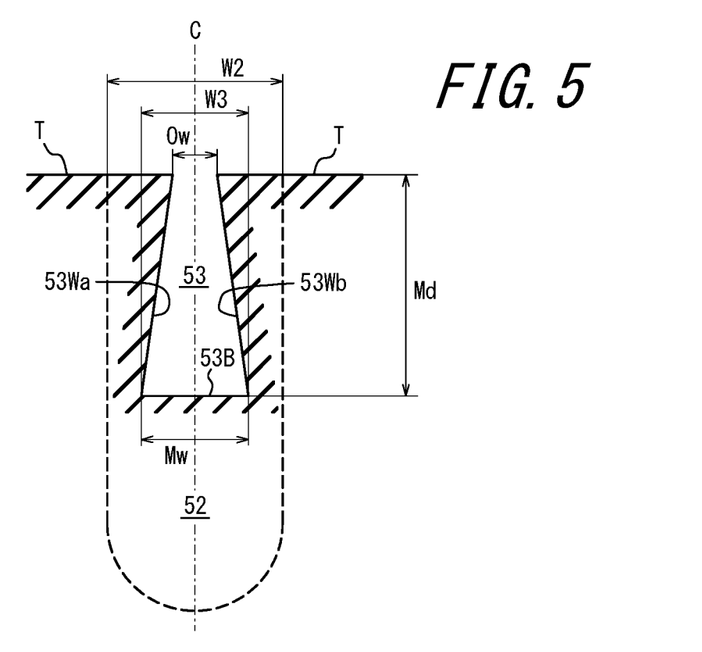
FIG. 5 is a cross-sectional view of a second width direction groove in still another embodiment of the disclosure.

FIG. 5 similarly illustrates a second width direction groove 53 in still another embodiment of the disclosure as an example of the shape of the second width direction groove that is hard to close even during the ground contact of the tire. The second width direction groove 53 has a trapezoidal cross section. Specifically, groove walls 53Wa and 53Wb of the second width direction groove 53 extend away from an opening centerline C of a first width direction groove 52, toward a side of a groove bottom 53B of the second width direction groove 53 in a depth direction, and inner edges of the groove walls 53Wa and 53Wb in a tire radial direction are connected by the groove bottom 53B. Note that in this example, a ratio of a groove width Ow at an opening edge to the tread surface T, a groove width Mw in the groove bottom 53B and a groove depth Md of the second width direction groove 53 is 1:3:8. More specifically, in the present embodiment, for example, Ow=0.5 mm, Mw=1.5 mm, and Md=4 mm. Note that the ratio can be 1:2:6 (e.g., Ow=0.5 mm, Mw=1 mm, and Md=3 mm) or the like. Note that in the present embodiment, Mw=W3.

Figure 6:
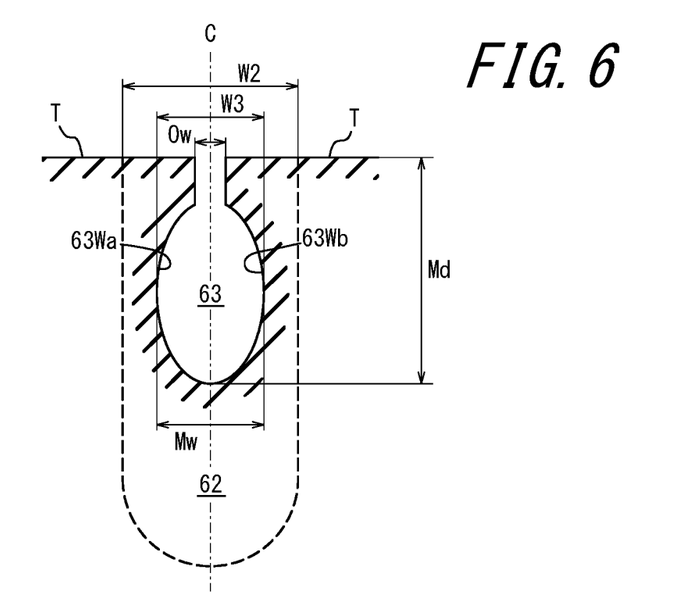
FIG. 6 is a cross-sectional view of a second width direction groove in a further embodiment of the disclosure.

FIG. 6 similarly illustrates a second width direction groove 63 in a further embodiment of the disclosure as an example of the shape of the second width direction groove that is hard to close even during the ground contact of the tire. The second width direction groove 63 has a cross section including a rectangular inlet portion opened in a tread surface T and an elliptic main body portion adjacent to an inner edge of the inlet portion in a tire radial direction. Note that in this example, a ratio of a groove width Ow at an opening edge to the tread surface T, a groove width Mw of the main body portion and a groove depth Md of the second width direction groove 63 is 1:3:8. More specifically, in the present embodiment, for example, Ow=0.5 mm, Mw=1.5 mm, and Md=4 mm. Note that in the present embodiment, Mw=W3.

Note that in the second width direction groove 3 having the inverted trapezoidal cross section illustrated in FIG. 2, a ratio of a groove width Ow at an opening edge to a tread surface T, a groove width Mw in the groove bottom 3B, and a groove depth Md of the second width direction groove 3 is 3 or more:2:6. More specifically, in the present embodiment, for example, Ow=1.5 mm or more, Mw=1 mm, and Md=3 mm. Note that in the present embodiment, Ow=W3.

As described above, the groove width of the second width direction groove may be identical over the whole region including the opening edge to the tread surface T in the depth direction as in the second width direction groove 43 illustrated in FIG. 4. However, the groove width of the opening edge to the tread surface T may be different from the groove width of at least a part of the region in the depth direction, for example, as in the second width direction groove 3, the second width direction groove 53 and the second width direction groove 63 illustrated in FIG. 2, FIG. 5 and FIG. 6. The latter (the groove width of the second width direction groove at the opening edge to the tread surface T is different from that in at least a part of the region in the depth direction) is more preferable in that damping characteristics of resonance sound are freely adjustable regardless of the groove width of the second width direction groove at the opening edge to the tread surface T.

Note that in the above described respective embodiments, as illustrated in FIGS. 2 to 6, the second width direction groove has a symmetrical shape to the opening centerline C of the width direction groove in cross-sectional view, but may have an asymmetric shape.

Alternatively, in the above described respective embodiments, as illustrated in FIGS. 1 to 6, only one second width direction groove is provided in one first width direction groove, but a plurality of second width direction grooves may be provided together in the same extending region or different extending regions in the one first width direction groove. In this case, it is considered that "the cross-sectional area of the second width direction groove" in "the cross-sectional area of the second width direction groove/the cross-sectional area of the first width direction groove" described above is a cross-sectional area of each of the individual second width direction grooves.

Figure 7:
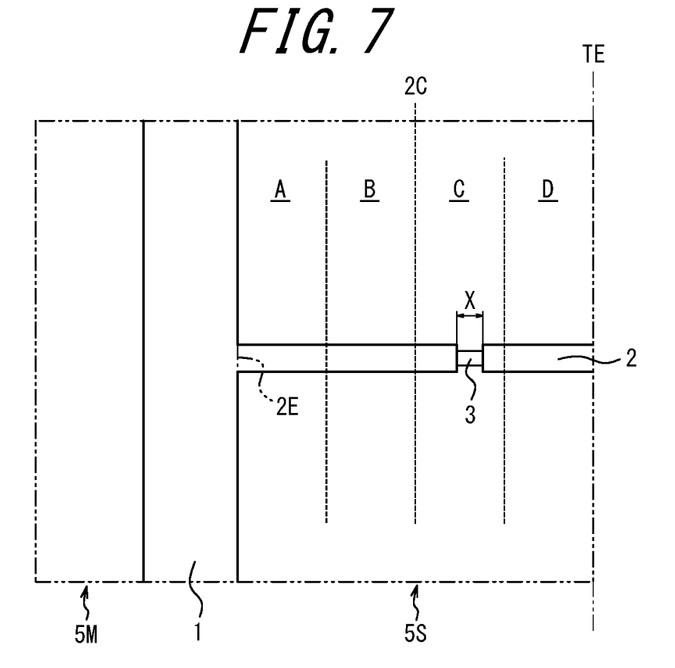
FIG. 7 is a partially enlarged developed view of a shoulder land portion of the tire illustrated in FIG. 1.

Furthermore, in the above described respective embodiments, as illustrated in FIG. 1 and after-mentioned FIG. 7, the second width direction groove extends along the extending direction of the first width direction groove in developed view of the tread surface (i.e., at the angle of 0° to the extending direction of the first width direction groove), but the groove does not have to extend along the first width direction groove as long as the second width direction groove communicates with the first width direction groove at both edges of the second width direction groove in the extending direction thereof. However, from a viewpoint of sufficiently acquiring flow of air outwardly in the tire width direction and more sufficiently acquiring the reduction effect of the air column resonance sound by the second width direction groove, it is preferable that the second width direction groove extends along the extending direction of the first width direction groove.

Additionally, as described above, it is considered that the second width direction groove is the groove opened to the tread surface, but the second width direction groove may be replaced with a communication hole that communicates with the first width direction groove at both edges in an extending direction and that is not opened to the tread surface. However, it is necessary that the communication hole does not completely close even during the ground contact of the tire in the same manner as in the second width direction groove of each of the above described embodiments.

Furthermore, FIG. 7 is a partially enlarged view of the shoulder land portion 5S illustrated in FIG. 1.

As illustrated in FIG. 7, it is preferable that an edge of a second width direction groove 3 on a circumferential groove 1 side is located on an outer side from a middle point 2C between a tire width direction inner edge 2E of a first width direction groove 2 and a tread ground contact edge TE in a tire width direction (a middle point of a line segment connecting the tire width direction inner edge 2E of the first width direction groove 2 to the tread ground contact edge TE). This is because flow of air in the first width direction groove 2 on the circumferential groove 1 side from the second width direction groove 3 can be further sufficiently acquired, air flowing into the second width direction groove 3 flows at a higher speed, a damping effect by viscosity increases, and air column resonance sound can be further reduced in a case where the edge of the second width direction groove 3 on the circumferential groove 1 side is located on the outer side from the above middle point 2C in the tire width direction, as compared with a case where the edge of second width direction groove 3 on the circumferential groove 1 side is located on the above middle point or on an inner side of the above middle point 2C in the tire width direction.

Furthermore, as illustrated in FIG. 7, it is preferable that at least a part of the second width direction groove 3 is located in a second-outermost tire width direction region C in the tire width direction among four tire width direction regions A, B, C and D formed by dividing a tire width direction distance between the tire width direction inner edge 2E of the first width direction groove 2 and the tread ground contact edge TE into four equal regions. In this case, the second width direction groove 3 is always disposed in a tread footprint, so that the reduction effect of the air column resonance sound by the second width direction groove 3 can be further securely obtained.

Additionally, in the tire of the disclosure, it is preferable to dispose two or more first width direction grooves 2 each having the second width direction groove 3 in a tire footprint (the surface of the tire that comes in contact with the road surface during the ground contact), and it is further preferable to dispose four or more first width direction grooves. Note that the damping effect of the resonance sound by the second width direction groove 3 is proportional to the number of the first width direction grooves 2 each having the second width direction groove 3 to be disposed, but from a viewpoint that rigidity of the shoulder land portion 5S is not excessively decreased, it is preferable to dispose six or less first width direction grooves.

Note that in the example illustrated in FIG. 1, a groove, a sipe or the like other than the first width direction groove 2 and the second width direction groove 3 is not disposed in the shoulder land portion 5S. For example, various types of grooves or sipes can be arbitrarily provided in accordance with expected tire properties. For example, another width direction groove that is wider than the first width direction groove 2 can be provided besides the first width direction groove 2 provided with the second width direction groove 3. For example, various types of grooves or sipes can be similarly arbitrarily provided also in the center land portion 5C and the intermediate land portions 5M in accordance with an expected tire property.

REFERENCE SIGNS LIST 1 circumferential groove
2 first width direction groove
2B groove bottom of the first width direction groove
2C middle point between a tire width direction inner edge of the first width direction groove and a tread ground contact edge
2E tire width direction inner edge of the first width direction groove
2Wa and 2Wb groove wall of the first width direction groove
3, 43, 53, and 63 second width direction groove
3B, 43B, 53B and 63B groove bottom of the second width direction groove
3Wa, 3Wb, 43Wa, 43Wb, 53Wa, 53Wb, 63Wa and 63Wb groove wall of the second width direction groove
5C center land portion
5M intermediate land portion
5S shoulder land portion
10 tire
T tread surface
TC tire equatorial plane
TE tread ground contact edge
W1 groove width of the circumferential groove
W2 groove width of the first width direction groove
W3 groove width of the second width direction groove
X extending length of the second width direction groove

The invention claimed is:

1. A tire having, in a tread surface, at least one circumferential groove continuously extending in a tire circumferential direction, and a shoulder land portion partitioned with the circumferential groove and a tread ground contact edge, wherein
the shoulder land portion has a first width direction groove that extends in a tire width direction and via which the circumferential groove communicates with the tread ground contact edge,
the first width direction groove has, in the first width direction groove, a second width direction groove that communicates with the first width direction groove,
respective groove widths of the circumferential groove, the first width direction groove and the second width direction groove satisfy the following relational expression:
the groove width of the circumferential groove>the groove width of the first width direction groove>the groove width of the second width direction groove,
in the first width direction groove, only one second width direction groove is provided, and an edge of the second width direction groove on a side of the circumferential groove is located on an outer side from a middle point between a tire width direction inner edge of the first width direction groove and the tread ground contact edge in the tire width direction,
at least a part of the second width direction groove is located in a second-outermost tire width direction region in the tire width direction among four tire width direction regions formed by dividing a tire width direction distance between a tire width direction inner edge of the first width direction groove and the tread ground contact edge into four equal regions, and a distance between a groove bottom of the second width direction groove and a groove bottom of the first width direction groove is 1.0 mm or more.

2. The tire according to claim 1, wherein a ratio of the groove width of the first width direction groove to the groove width of the circumferential groove is 0.1 or more and 0.5 or less.

3. The tire according to claim 1, wherein a distance between a groove wall of the second width direction groove and a groove wall of the first width direction groove is 0.25 mm or more.

* * * * *